United States Patent

[11] 3,622,703

| | | |
|---|---|---|
| [72] | Inventors | Luther W. Ricketts, Jr.;<br>Richard E. Sweenie, both of Urbana, Ill. |
| [21] | Appl. No. | 33,034 |
| [22] | Filed | Apr. 29, 1970 |
| [45] | Patented | Nov. 23, 1971 |
| [73] | Assignee | The Magnavox Company<br>Fort Wayne, Ind.<br>Continuation of application Ser. No. 661,394, Aug. 17, 1967, now abandoned. This application Apr. 29, 1970, Ser. No. 33,034 |

[54] ELECTRONIC SYNCHRONIZING SYSTEM EMPLOYING PLURAL SWITCHED OSCILLATORS
14 Claims, 12 Drawing Figs.

[52] U.S. Cl. .................................................. 178/69.5 F,
318/85, 318/318
[51] Int. Cl. ...................................................... H04n 1/36
[50] Field of Search .......................................... 178/69.5 F;
318/158, 174, 85, 167, 314, 318, 450, 175;
325/321; 317/6

[56] References Cited
UNITED STATES PATENTS

| | | | |
|---|---|---|---|
| 2,722,564 | 11/1955 | McFarlane ................ | 178/69.5 F |
| 2,512,647 | 6/1950 | Hester ........................ | 318/174 |
| 3,307,092 | 2/1967 | Trocchio .................... | 318/174 |

Primary Examiner—Robert L. Griffin
Assistant Examiner—George G. Stellar
Attorney—Richard T. Seeger

ABSTRACT: The rotational speed and position of one synchronous motor is synchronized with the rotational speed and position of another synchronous motor by electronically comparing the time occurrence of respective pulses produced by each motor. The time occurrence of pulses from the one motor relative to pulses from the other motor is used to speed up or slow down the one motor until its speed and position are synchronized with the speed and position of the other motor. When the one motor is synchronized with the other motor, the one motor may then have its speed controlled by fixed means.

INVENTORS.
LUTHER W. RICKETTS, JR.
RICHARD E. SWEENIE
BY
Jeffers and Young
ATTORNEYS

INVENTORS.
LUTHER W. RICKETTS, JR.
RICHARD E. SWEENIE

BY

*Jeffers and Young*
ATTORNEYS

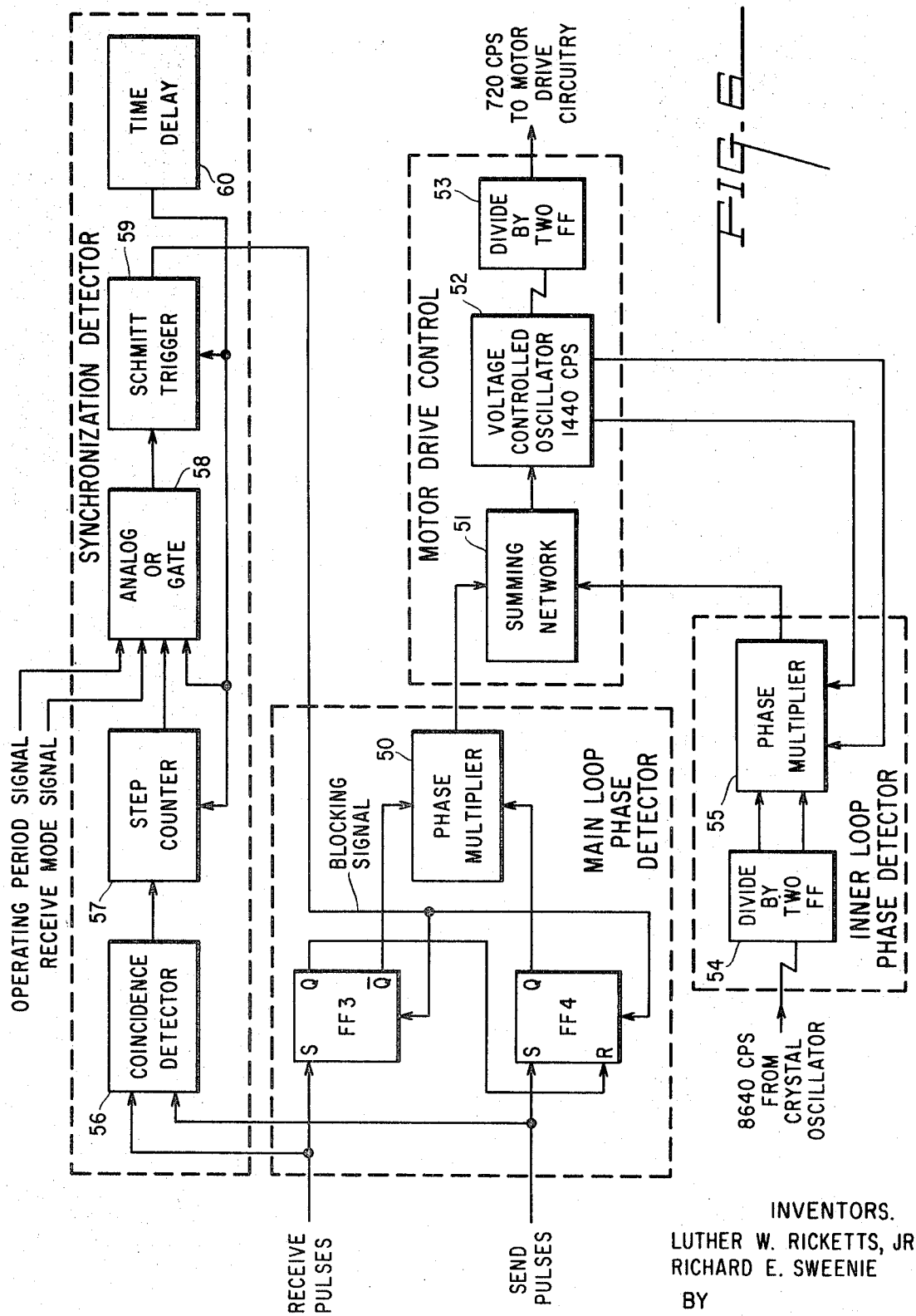

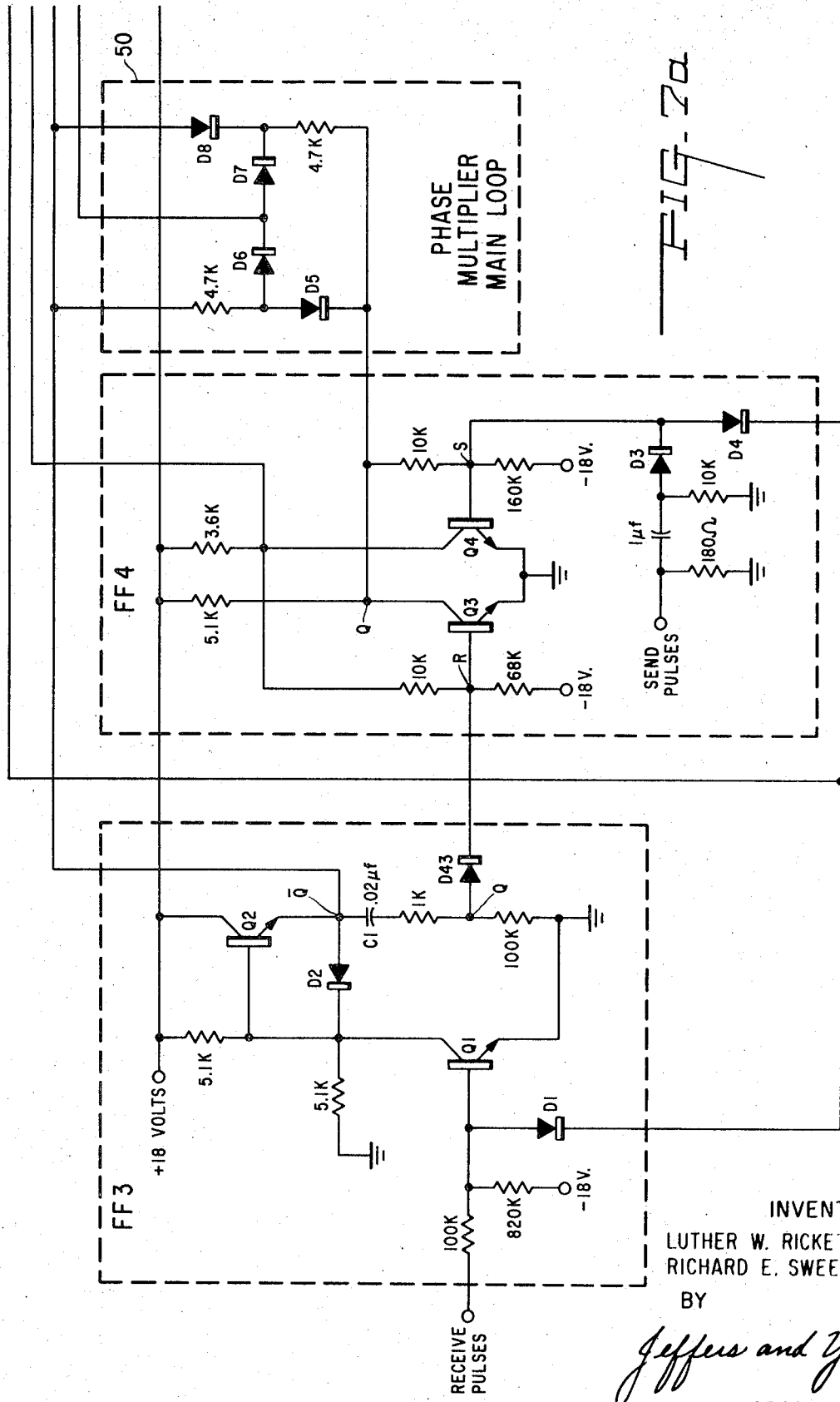

INVENTORS.
LUTHER W. RICKETTS, JR.
RICHARD E. SWEENIE
BY
*Jeffers and Young*
ATTORNEYS

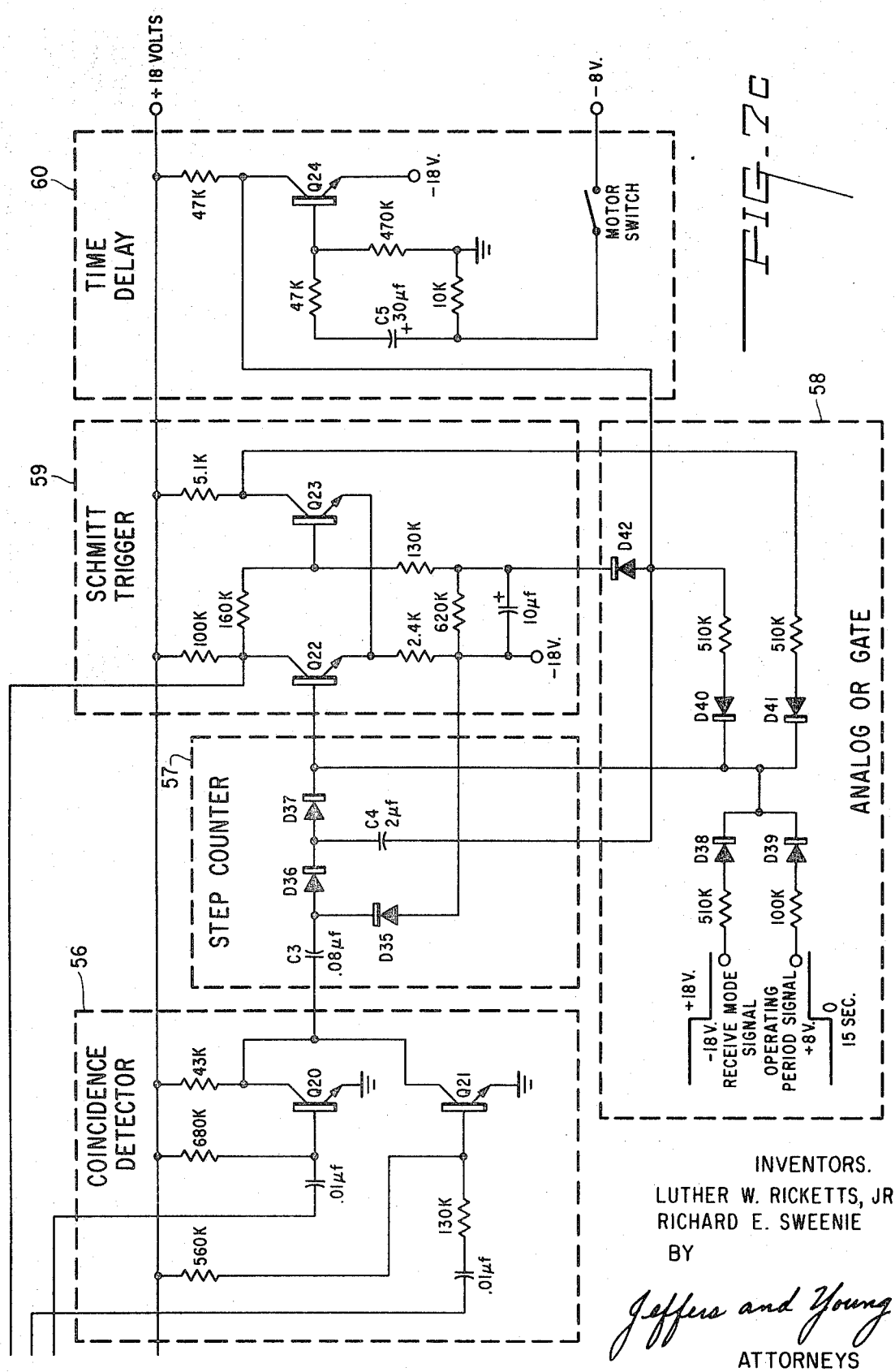

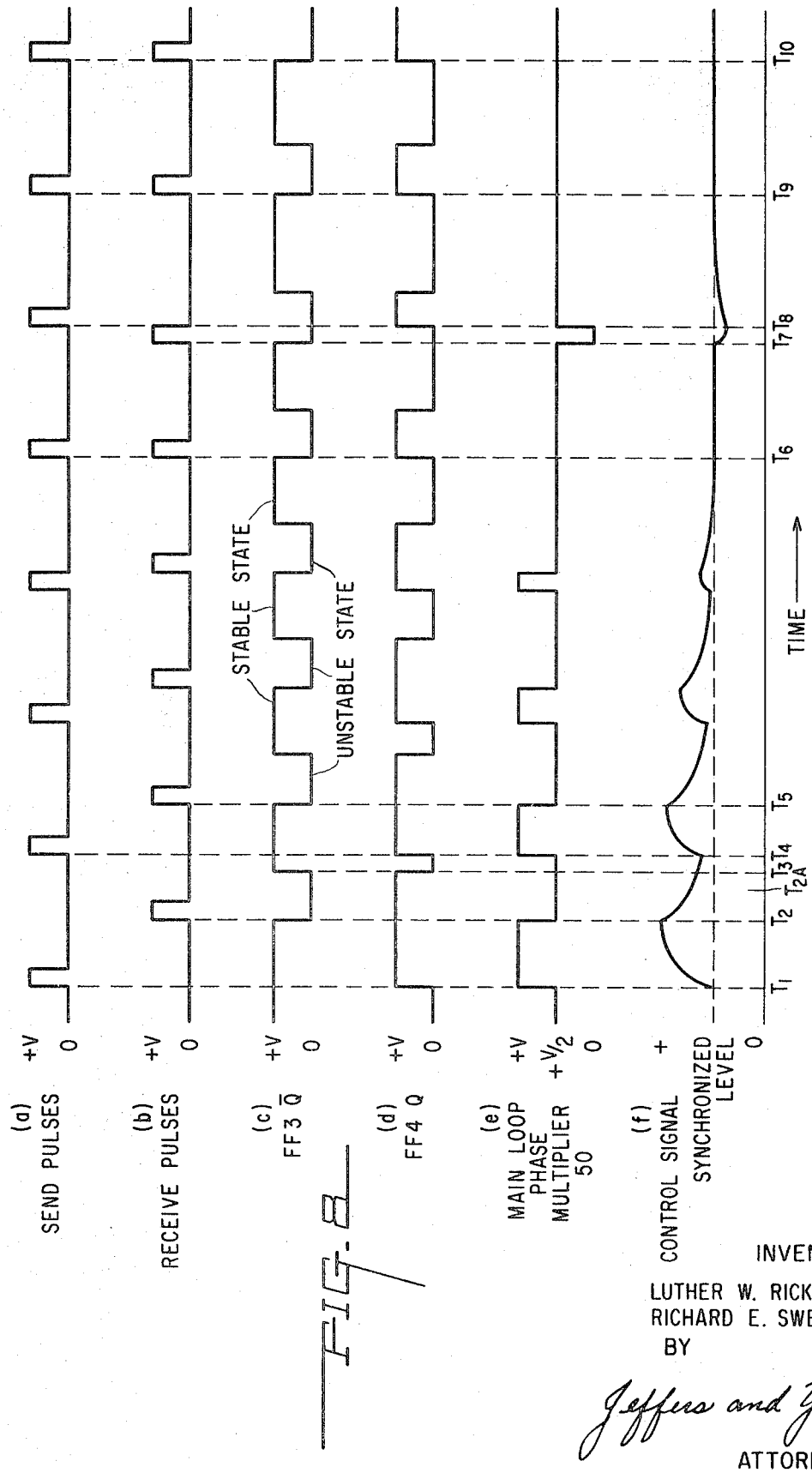

ELECTRONIC SYNCHRONIZING SYSTEM EMPLOYING PLURAL SWITCHED OSCILLATORS

This application is a continuation of application, Ser. No. 661,394, filed: Aug. 17, 1967 now abandoned.

BACKGROUND OF THE INVENTION

Our invention relates to electronic synchronizing means, and particularly to electronic synchronizing means for synchronizing the speed and position of one synchronous motor with the speed and position of a second synchronous motor.

Synchronous motors are used in many applications because their speed may be controlled or varied by the frequency of the electrical voltage applied to the motor. Such motors are frequently used in facsimile systems where information at a first location is optically scanned and electrical signals produced which are indicative of the information scanned. The scanning is provided by either the document or the scanner being rotated by a synchronous motor. These electrical signals are transmitted to a second location where they are converted to information in a desired form. Usually, the information at the first location is in the form of a document, and the information produced at the second location is also in the form of a document. The document at the second location is usually provided by a writing device and a medium such as paper, one of which is rotated by a synchronous motor. In order that the document produced at the second location be accurate and correct, the rotational position and speed of the rotating element at the second location should be accurately synchronized with the rotational position and speed of the rotating element at the first location. If there is no synchronization between the rotating elements at the two locations, the document produced at the second location will be inaccurate, or distorted, or even useless.

The necessary speed and position synchronization between the two synchronous motors has been provided in many ways, including mechanical devices and electrical devices. The process of producing this synchronization is sometimes called framing. However, these synchronizing devices have not always been feasible or practical with certain facsimile systems. Or, these synchronizing devices have not provided the necessary synchronization, or have not provided synchronization quickly enough for certain types of facsimile systems.

Accordingly, an object of our invention is to provide an improved synchronizing system for synchronizing the rotational position and speed of a receiving synchronous motor with the rotational speed of a sending synchronous motor.

Another object of our invention is to provide an improved synchronizing system for use in a facsimile system.

Another object of our invention is to provide an improved synchronizing system which can be readily adapted to existing facsimile systems.

Another object of our invention is to provide a synchronizing system that can rapidly synchronize the speed and position of one synchronous motor with the speed and position of a second synchronous motor.

Facsimile systems frequently use long distance telegraph or telephone facilities. Since such facilities are often provided or leased on the basis of actual use time, it is desirable and economical that synchronization between the receive and send motors be provided in as short a time as possible. Some facsimile systems actually require that synchronization or framing be achieved in a few seconds, frequently less than ten seconds.

Accordingly, an object of our invention is to provide a relatively rapid framing system for facsimile systems.

Another object of our invention is to provide a system for synchronizing the speed and position of a receive motor with the speed and position of a send motor in a few seconds.

These long distance facilities have electrical characteristics that may vary with time. Where send motor pulses are relied upon to achieve synchronization, such variations may produce errors, or distortion, or illegible documents.

Accordingly, another object of our invention is to provide a facsimile synchronizing system that utilizes the send motor to achieve synchronization and that then shifts control of synchronization to a fixed frequency oscillator at the receive location.

Another object of our invention is to provide a facsimile framing system that is independent of variations in electrical characteristics of connecting lines.

SUMMARY OF THE INVENTION

Briefly, these and other objects are achieved in accordance with our invention by providing respective pulse generators for first and second synchronous motors whose speed and position are to be synchronized. The pulses are applied to an error generator which produces an electrical error signal indicative of the relative time relation of the pulses produced. The error signal is applied to a voltage controlled oscillator to cause the oscillator to produce a frequency which speeds up or slows down the second motor to bring its position and speed into agreement with the position and speed of the first motor in the shortest possible time. That is, our system utilizes logic to provide an error signal based on the smallest time difference between the sets of pulses to correct the speed and position of the second motor in the shortest possible time. After the position and speed of the two motors are synchronized, an indication is provided so that the second motor is controlled by a stable, fixed frequency oscillator. This oscillator maintains the synchronous speed of the second motor close to the synchronous speed of the first motor for the length of time needed to transmit information over the facsimile system.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

FIG. 6 shows a block diagram of another embodiment of our synchronizing system;

FIGS. 7a, 7b, and 7c show an electrical circuit diagram of the synchronizing system of FIG. 6; and FIG. 8 shows waveforms illustrating the operation of the circuit of FIG. 7.

DESCRIPTION OF THE PREFERRED EMBODIMENTS

Figure 1:
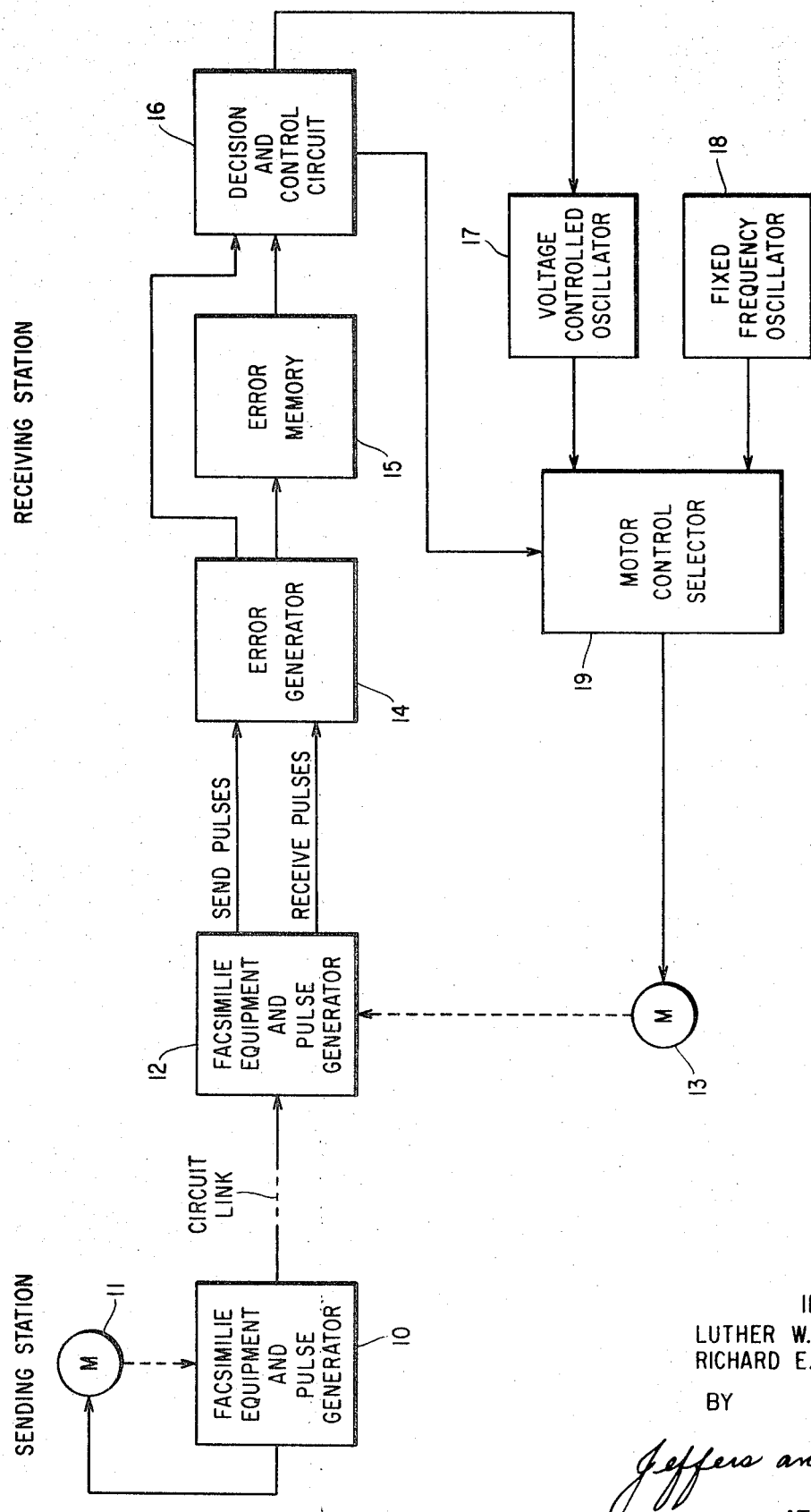
FIG. 1 shows a block diagram of one embodiment of our synchronizing system.

In FIG. 1, we have shown a block diagram of a facsimile system having a sending station and receiving station connected by a circuit link, such as a telephone line, a radio circuit, a wire line, or some combination of these. Information at the sending station is transmitted over the facsimile system to the receiving station. The sending station has facsimile equipment 10, and a pulse generator 11, and a synchronous motor 11. The facsimile equipment may be any suitable type known in the art, which can scan information at the sending station and produce electrical signals for transmission to the receiving station. The motor 11 is used to provide scanning of the information at the sending station as indicated by the dashed line, under the control of the facsimile equipment as indicated by the solid line. The pulse generator may include any suitable type of device which produces one or more pulses at a particular location for each revolution of the motor 11. By way of example only, it has been assumed that for a normal speed of the motor 11, a send pulse is produced every 333 milliseconds (ms.).

The receiving station also includes facsimile equipment and a pulse generator 12. This facsimile equipment is also known in the art, and is compatible with the facsimile equipment at the sending station. The receiving facsimile equipment utilizes the electrical signals from the sending facsimile equipment and reproduces this information at the receiving station. This receiving facsimile equipment also utilizes an electrical synchronous motor 13. The motor 13 is under the control of the facsimile equipment, and is utilized to rotate portions of this facsimile equipment as indicated by the dashed line. A pulse generator is provided for the receiving equipment and may be any suitable type of generator which produces one or more pulses at a particular location for each revolution of the receiving station motor 13. The receiving facsimile equipment produces send pulses which are provided by the sending station motor 11, and produces receive pulses which are provided by the receiving station motor 13, and applies these pulses to an error generator 14. In the example assumed, a receive pulse is also produced every 333 milliseconds when the receive motor 13 is operating at the desired speed. The error generator 14 produces a signal indicative of the magnitude of the smaller phase relation between the send and receive pulses. That is, for a given average time between each of the send pulses, the error generator 14 produces error signals indicative of the phase relation of the send and receive pulses which are separated by a time less than half of this average time. These error signals are applied to an error memory 15. The error generator 14 also produces information indicative of whether the received pulses are ahead or behind the send pulses. This information is applied to a decision and control circuit 16. Information in the error memory 15 is also applied to the decision and control circuit 16. The decision and control circuit 16 produces a suitable signal or voltage which is applied to a voltage controlled oscillator 17. This signal or voltage controls the frequency of the oscillator 17. The output frequency of the oscillator 17 is applied through a motor control selector 19 to the motor 13. The frequency of the oscillator 17 is set by the voltage applied from the decision and control circuit 16 in such a direction and manner as to synchronize the position and speed of the receiving station motor 13 to the position and speed of the sending station motor 11. After synchronization is achieved, the decision and control circuit 16 supplies a signal to the motor control selector 19 which then disconnects the oscillator 17 from the motor 13 and connects a stable, fixed frequency oscillator 18 to the motor 13. Then, the motor 13 is controlled by the fixed frequency oscillator 18, which can maintain the synchronous position and speed of the receiving station motor 13 close to the position and speed of the sending station motor 11.

Thus, our invention synchronizes the speed and relative rotational position of two synchronous motors, and thereafter switches control of one motor, usually the receiving station motor to a fixed frequency oscillator.

Figure 2:
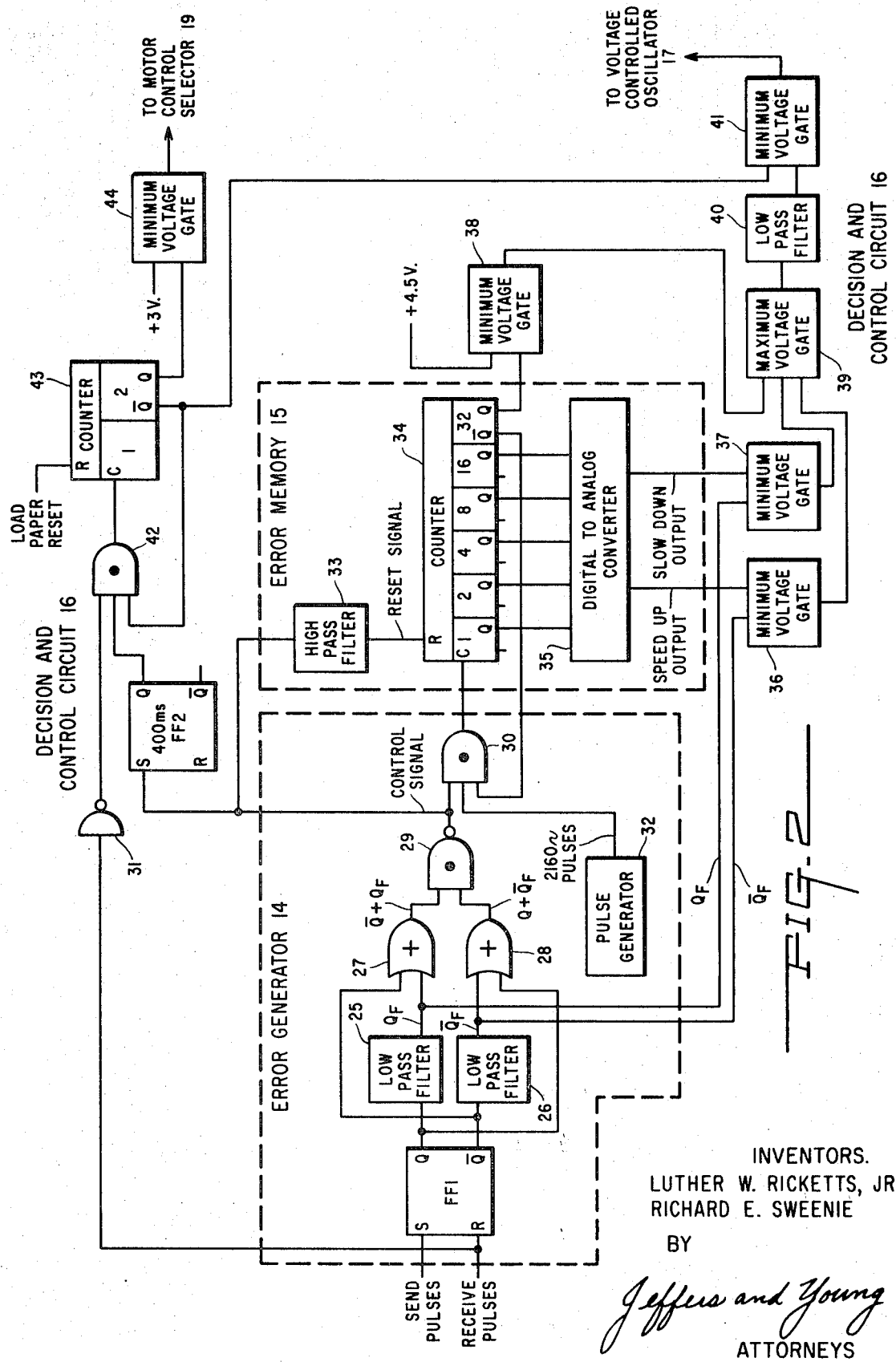
FIG. 2 shows a circuit diagram of our electronic synchronizing system utilizing digital type circuits.

FIG. 2 shows a circuit diagram of a synchronizing system that uses digital circuits in accordance with our invention. In FIG. 2, the error generator 14 is shown enclosed in dashed lines, and the error memory 15 is also shown in dashed lines. The remainder of the circuit of FIG. 2 comprises the decision and control circuit 16. The voltage controlled oscillator 17 and the fixed frequency oscillator 18 are known in the art, and are not shown in detail. A voltage controlled oscillator produces a selected frequency in accordance with an applied voltage as is known in the art. The motor control selector 19 is also known in the art, and simply connects the motor 13 to either the oscillator 17 or the oscillator 18 in accordance with a signal supplied by the decision and control circuit 16.

The circuit of FIG. 2 uses a number of digital elements which, although known in the art, will be explained. These digital elements use logic signals which will be called either a logic 0 (which in this explanation is 0 volts) and a logic 1 (which in this explanation is +4.5 volts). The elements include multiple input OR gates such as the gates 27, 28. The logic function of these OR gates 27, 28 is such that if any one of the gate inputs is at a logic 1, then a logic 1 is produced at the gate output; and that if all of the gate inputs are at a logic 0, then a logic 0 is produced at the gate output. The logic elements also include a multiple input NAND gate 29. The logic function of this gate 29 is such that if any one of the gate inputs is at a logic 0, then a logic 1 is produced at the gate output; and that if all of the gate inputs are at a logic 1, then a logic 0 is produced at the gate output. The logic elements also include multiple input AND gates such as the gates 30, 42. The logic function of these AND gates 30, 42 is such that if any one of the gate inputs is at a logic 0, then a logic 0 is produced at the gate output; and that if all of the gate inputs are at a logic 1, then a logic 1 is produced at the gate output. The logic elements also include an inverter 31 which inverts the logic applied to its input to the opposite logic at its output. The logic elements also include minimum voltage gates such as the gates 36, 37. These minimum voltage gates 36, 37 select the lowest voltage applied to the inputs and produce this lowest voltage at its output. The logic elements also include maximum voltage gates, such as the gate 39. The maximum voltage gate selects the highest voltage applied to its input and produces this highest voltage at its output. The logic elements also include a bistable flip-flop FF1 having a set input S, a reset input R, and Q and $\overline{Q}$ outputs. This flip-flop FF1 operates in accordance with the following truth table:

| S | R | Q | $\overline{Q}$ |
|---|---|---|---|
| 0 | 0 | 1 | 1 |
| 0 | 1 | 1 | 0 |
| 1 | 0 | 0 | 1 |
| 1 | 1 | No change | |

The logic elements also include a second flip-flop FF2 which is an astable or one shot multivibrator. In this embodiment, the flip-flop FF2 has an astable state which, on the basis of a send pulse every 333 milliseconds and a receive pulse every 333 milliseconds, has been selected to be 400 milliseconds. This time, as well as the 333 millisecond period, may have other values. In the stable state, the flip-flop FF2 has its Q output at a logic 1. However, when a logic 1 is applied to its set input S, the flip-flop FF2 is switched to its astable state and its output Q becomes a logic 0. If no further logic 1 is applied to the set input S, the output Q returns to a logic 1 after 400 milliseconds. However, if another logic 1 is applied to the set input S within 400 milliseconds, the output Q remains at a logic 0 for another 400 milliseconds. A six stage binary counter 34 is utilized in the error memory 15. Count pulses of a logic 1 are applied to the counter 34 at its count input C. The counter 34 may be reset by a logic 1 applied to its reset input R. The six stages have decimal counts or significances of 1, 2, 4, 8, 16, and 32. When a count is present in a stage, the Q output of the stage is at a logic 1 and the $\overline{Q}$ output is at a logic 0. If no count is present in a stage, the Q output of the stage is at a logic 0 and the $\overline{Q}$ output is at a logic 1. The counter 43 in the decision and control circuit 16 is similar to the counter 34, but only has two stages.

Figure 3A:
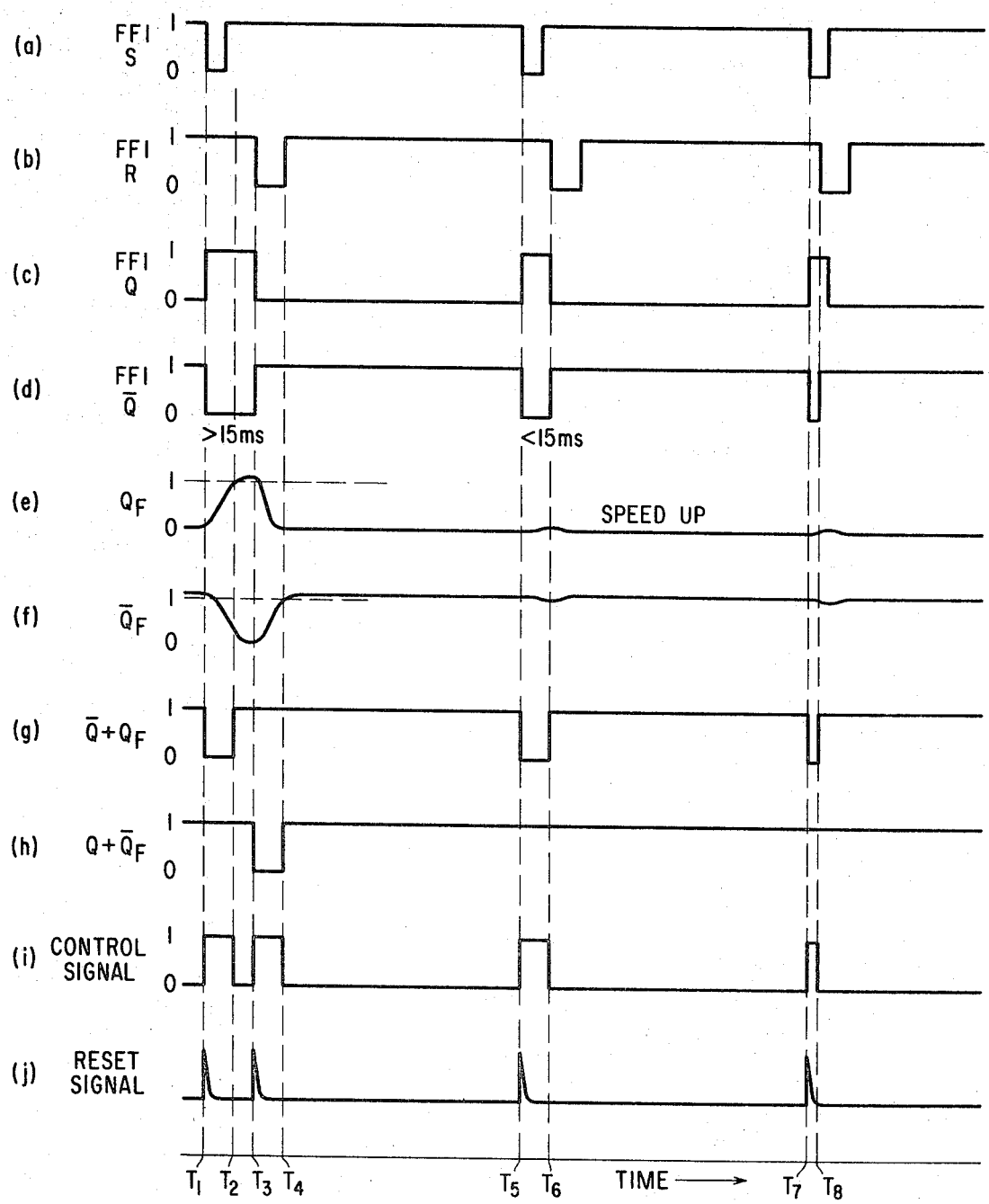
FIGS. 3a, 3b, and 3c show waveforms illustrating the operation of portions of the circuit of FIG. 2.
Figure 3B:
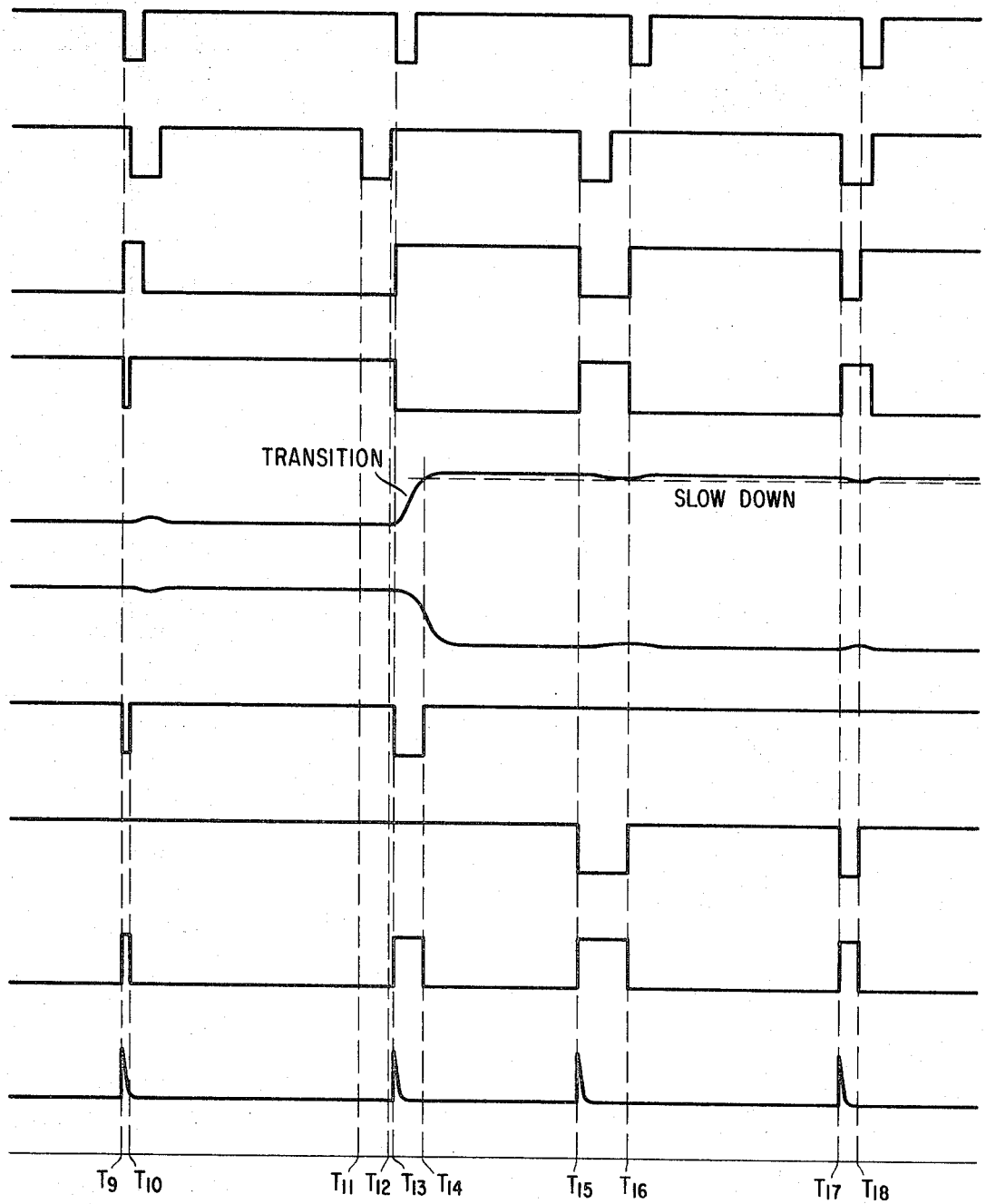
Figure 3C:
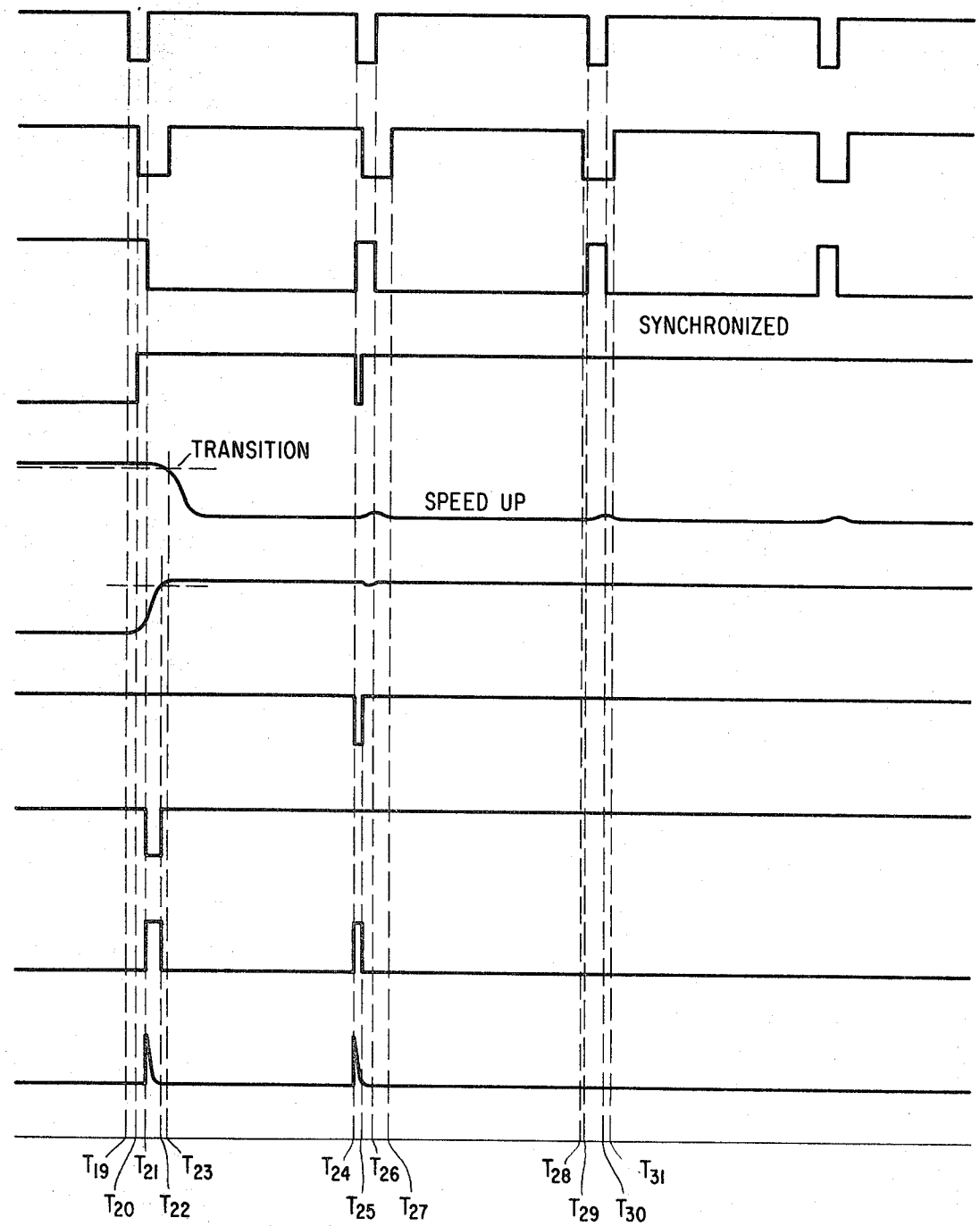

The error generator 14 will be explained in connection with the waveforms shown in FIGS. 3a, 3b, and 3c. These waveforms are plotted along a continuous, common time axis running from left to right beginning with FIG. 3a at the left, extending to the right to FIG. 3b, and extending further to the right to FIG. 3c. In these wave forms, the send pulses provided by the sending station facsimile equipment and pulse generator 10 are shown in waveform (a), and the receive pulses provided by the receiving station facsimile equipment and pulse generator 12 are shown in waveform (b). In waveforms (a) and (b), it has been assumed that these pulses vary between a logic 1 and a logic 0 as shown. However, the pulses may be shaped to vary between any desired logic levels. The send pulses are applied to the set input S of the flip-flop FF1, and the receive pulses are applied to the reset input R of the flip-flop FF1. A send pulse, indicated by the transition from a logic 1 to a logic 0, is received at the time T1. At this time, it has been assumed that the receiving station motor 13 is behind in its rotational position relative to the sending station motor 11. Thus, the receive pulses applied to the reset input R and shown in waveform (bB) are at a logic 1 at the time T1. The Q and $\overline{Q}$ outputs of the flip-flop FF1 are shown in waveforms (c) and (d). These Q and $\overline{Q}$ outputs are respectively applied to low pass filters 25, 26 whose filtered output waveforms are shown as $Q_F$ and $\overline{Q}_F$ in waveforms (e) and (f). The logic level transition points for these two filtered outputs $Q_F$ and $\overline{Q}_F$ are indicated by the dashed and dotted lines at the logic level 1. The $\overline{Q}$ output and the $Q_F$ output are applied to the OR gate 27, and the output of this OR gate 27 is shown in waveform (g). Likewise, the Q output and the $\overline{Q}_F$ output are applied to the OR gate 28, and the output of this OR gate 28 is shown in waveform (h). The output of the two OR gates 27, 28 are applied to the NAND gate 29, which produces a control signal at its output. This control signal is shown in waveform (i). The control signal is applied to the AND gate 30, and the output of the AND gate 30 is applied to the count input C of the counter 34. The control signal is also applied to the decision and control circuit 16 at the set input S of the flip-flop FF2. This control signal is also applied to the error memory 15 at a high pass filter 33. The filter 33 produces a reset signal for the counter 34. This reset signal has been shown in waveform (j).

At the time T1, it has been assumed that both motors 11, 13 are building up to the desired speed, and that the position or speed of the receive motor 13 lags the position or speed of the send motor 11 by a small amount. At the time T1, the send pulse goes to a logic 0 and the set input S of the flip-flop FF1 goes to a logic 0, the Q output goes to a logic 1 and the $\overline{Q}$ output goes to a logic 0, as indicated in the truth table. Thus, the filter output $Q_F$ begins to rise, and the filter output $\overline{Q}_F$ begins to fall. At the time T1, the signals applied to the OR gate 27 are both at a logic 0 so that the output of the OR-gate 27 goes to a logic 0 as shown in waveform (g). The signals applied to the OR gate 28 are both at a logic 1, although the signal $\overline{Q}_F$ is falling toward a logic 0. Hence, the output of the OR gate 28 is at a logic 1 as shown in waveform (h). With one input of the NAND gate 29 at a logic 0, the control signal rises to a logic 1 as shown in waveform (i).

It has been assumed that each of the send pulses is approximately 12 milliseconds long. Thus, 12 milliseconds after the time T1, this being before the time T2, the send pulse returns to a logic 1 as shown in waveform (a). As shown by the truth table, no change takes place in the flip-flop FF1 when both inputs S and R are at a logic 1. Hence, nothing happens when the send pulse returns to a logic 1. At the time T2, the output $Q_F$ of the low pass filter 25 builds up to the level of a logic 1 as shown in waveform (e). This logic 1 is applied to the OR gate 27 so that the OR gate 27 produces a logic output 1 as shown in waveform (g). With both inputs to the NAND gate at logic 1, its output and the control signal become a logic 0 as shown in waveform (i). At the time T3, the first receive pulse is received to cause the outputs Q and $\overline{Q}$ of the flip-flop FF1 to switch to a logic 0 and a logic 1 respectively as shown in waveforms (c) and (d). When the output Q becomes a logic 0, and with the output $\overline{Q}_F$ already a logic 0, the output of the OR gate 28 becomes a logic 0 as shown in waveform (h). With one input to the NAND gate 29 now at a logic 0, its output and the control signal become a logic 1 as shown in waveform (i). It has been assumed that the receive pulses are approximately 15 milliseconds long. When the receive pulse returns to a logic 1, as indicated after the time T3 but before the time T4 in waveform (b), nothing happens. This is because both the inputs S and R to the flip-flop FF1 are at a logic 1, which is the no change condition. At the time T4, however, the output $\overline{Q}_F$ of the low pass filter 26 builds up to the level of a logic 1 as shown in waveform (f), so that one of the inputs to the OR gate 28 becomes a logic 1 again. The output of the OR gate 28 becomes a logic 1 as shown in waveform (h). Both inputs of the NAND gate 29 are a logic 1 so that the NAND gate 29 produces a control signal that is a logic 0.

In reviewing the operation of the error generator 14 between the times T1 and T4, it will be seen that a first control signal of logic 1 was produced between the time T1 and T2, and a second control signal of logic 1 was produced between the time T3 and T4. The time duration of these control signals is utilized to indicate the amount of error present between the send and receive pulses. For the closer set of send and receive pulses (that is a set of send and receive pulses that are separated by a time less than half the time between two send pulses), it will be seen that the receive pulse at the time T3 lags the send pulse at the time T1. Under this condition, it will be noted that the output $Q_F$ of the low pass filter 25 approaches and remains substantially at a logic 0 after the time T4, while the output $\overline{Q}_F$ of the low pass filter 26 remains substantially at a logic 1 after the time T4. These relative logic values are utilized to indicate that a speed up condition is called for. As will be explained, the time duration of the control signal is utilized to provide speeding up.

At the time T5, when the next send pulse is received, some speed up of the receive motor 13 has taken place. This is shown in the waveform (d) where the time between the occurrence of the send pulse at the time T5 and the occurrence of the next receive pulse at the time T6 is less than 15 milliseconds. This time of 15 milliseconds is too short for the low pass filter 25 to produce an output $Q_F$ greater than the logic 1 threshold, and for the low pass filter 26 to produce an output $\overline{Q}_F$ that is less than the logic 1 threshold. Both inputs $\overline{Q}$ and $Q_F$ to the OR gate 27 are at a logic 0 between the times T5 and T6, so that the output of the OR gate 27 as shown in waveform (g) is at a logic 0 at this time. The input $\overline{Q}_F$ to the OR gate 28 remains at a logic 1 so that the output of the OR gate 28 shown in waveform (h) remains at a logic 1. The NAND gate 29 thus produces a control signal output of a logic 1 between the times T5 and T6. It will be noted that this control signal has a time duration less than the sum of the control signals occurring between the times T1 and T2 and T3 and T4.

Between the times T7 and T8, another control signal calling for speed up is produced. This control signal, as shown in waveform (i), has a time duration that is still less than the control signal occurring at the times or between the times T5 and T6. Similarly, between the times T9 and T10, another control signal of still smaller time duration is produced. And, it will be noted in waveforms (a) and (b) that the time occurrences of the leading edges of the send and receive pulses are approaching the same time occurrence.

Because of the inertia of the receive motor 13, it has been assumed that some overshoot or some overcorrection occurs. So, at the time T11, a second receive pulse is produced as shown in waveform (b). This does not produce any change at the Q and $\overline{Q}$ outputs of the flip-flop FF1, since logic 1 and logic 0 at the S and R inputs continue to cause the Q and $\overline{Q}$ outputs to remain at a logic 0 and logic 1 respectively. At the time T12, the receive pulse returns to a logic 1. With the inputs S and R at a logic 1, no change occurs. At the time T13, a send pulse is received so that the S and R inputs are at a logic 0 and logic 1 respectively. This causes the outputs Q and $\overline{Q}$ to switch to a logic 1 and a logic 0. With both inputs to the OR gate 27 at a logic 0, the output of the OR gate 27 becomes a logic 0 as shown in waveform (g). This logic 0 causes the NAND gate 29 to produce a control signal output of logic 1 as shown in waveform (i). No change occurs in the output of the OR gate 28 as shown in waveform (h), since the output Q becomes a logic 1 before the output $\overline{Q}_F$ of the low pass filter 26 falls below the level of logic 1. This switching of the outputs Q and $\overline{Q}$ from logic 0 and logic 1 to logic 1 and logic 0 causes the inputs to the low pass filters 25, 26 to make a transition as shown in waveforms (e) and (f). However, because of the time delay of the filters 25, 26, the output $Q_F$ of the low pass filter 25 does not reach the level of a logic 1 until the time T14. When the output $Q_F$ of the low pass filter 25 reaches the level of a logic 1 at the time T14, a logic 1 is applied to the input of the OR gate 27. The output of the OR gate 27, as shown in waveform (g), returns to a logic 1. Both inputs to the NAND gate 29 are at a logic 1 so that the control signal shown in waveform (i) returns to a logic 0. A control signal having a time duration between the times T13 and T14 is produced, this duration being indicative of the relative time occurrence of the receive and send pulses. It will be noted that this time duration is greater than the duration of the control signal between the times T9 and T10. It will also be noted that the outputs $Q_F$ and $\overline{Q}_F$ of the low pass filters 25, 26 have switched from logic 0 and logic 1 to a logic 1 and logic and 0 respectively. These logic conditions are used to provide a slow down signal indicative of the time duration of the control signal.

Additional slow down control signals are provided between the times T15 and T16 and between the times T17 and T18. After the time T18, another overshoot occurs so that at the time T19, a second send pulse is received after the receive signal at time T17. This condition indicates that the receiving station motor 13 needs to be speeded up again. When a receive pulse is received at the time T20, the $\overline{Q}$ output becomes a logic 1 which starts the transition of the output $\overline{Q}_F$ of the filter 26. At the time T21, the send pulse returns to a logic 1 so that the Q output becomes a logic 0. This starts the transition of the output $Q_F$ of the filter 25. This also causes the output of the OR gate 28 to switch to a logic 0 and the control signal output of the NAND gate 29 to the switch to a logic 1. When the output $\overline{Q}_F$ of the filter 26 reaches the level of a logic 1 at the time T22, the output of the OR gate 28 becomes a logic 1. This logic 1, along with the logic 1 from the OR gate 27, causes the control signal output of the NAND gate 29 to become a logic 0. Thus, a control signal is produced between the times T21 and T22 under a slow down indication. This is an erroneous indication, but is not sufficient to cause appreciable slowing down of the motor because of its momentum. Another control signal is provided between the times T24 and T25, with speed up being indicated. At the time T28, a receive pulse occurs followed very shortly thereafter at the time T29 by a send pulse. At this time, the send and receive pulses are synchronized. At least one input to each of the OR gates 27, 28 is at a logic 1 so that both inputs to the NAND gate 29 are at a logic 1. Hence, the NAND gate 29 produces a control signal which remains at logic 0, and hence causes no speed up or slow down.

The control signals are supplied to a high pass filter 33 in the error memory 15. The filter 33 produces reset signals shown in waveform (j) of FIGS. 3a, 3b, and 3c. Each reset signal is applied to the reset input R of the counter 34 and resets all stages of the counter to zero, a condition indicated by all of the Q outputs being at a logic 0. The counter 34 receives count pulses at its count input C from the three input AND gate 30. One input of the AND gate 30 is connected to the control signal. A second input of the AND gate 30 is connected to a pulse generator 32 which produces clock pulses at a relatively high frequency which, in this embodiment, is 2,160 cycles. The third input of the AND gate 30 is connected to the $\overline{Q}$ output of the counter stage having a significance of 32. During the time that the control signal is at a logic 1, and immediately after the counter 34 has been reset, clock pulses are supplied to the count input C. The counter thus counts the clock pulses at a 2,160 cycle rate, and stores this count. When the control signal returns to a logic 0, the AND gate 30 permits no more pulses to be supplied to the count input C. If, during the time duration of the control signal, the counter reaches a count of 32, the $\overline{Q}$ output of the stage having a significance of 32 becomes a logic 0 which prevents further clock pulses from being applied to the count input C. Thus, the counter 34 is permitted to count only to a count of 32.

Figure 4:
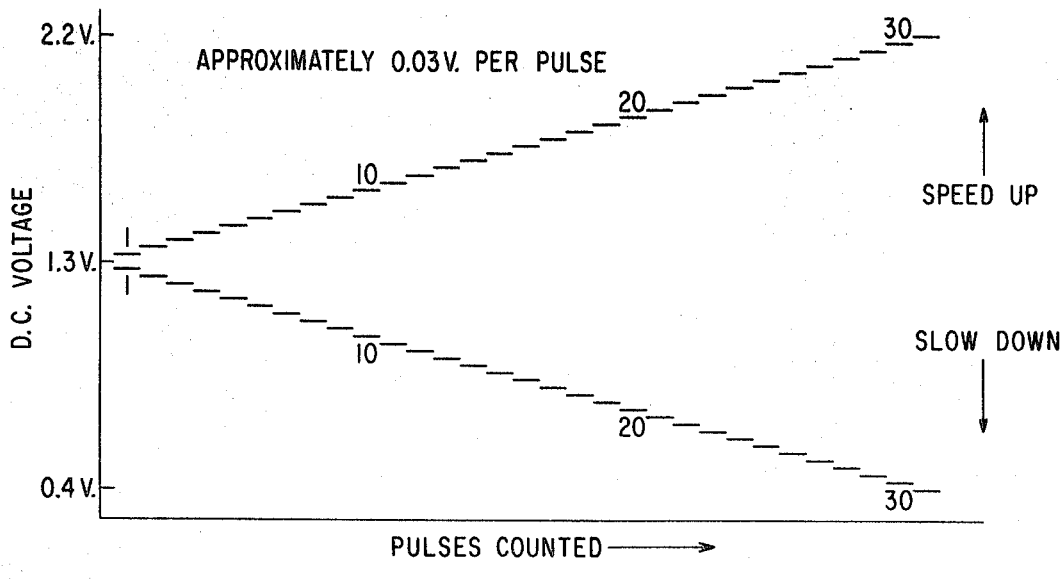
FIG. 4 shows waveforms illustrating the operation of other portions of the circuit of FIG. 2.

The stages having significances of 1, 2, 4, 8, and 16 have their Q output connected to a digital to analog converter 35 which is known in the art. The converter 35 has a speed up output and a slow down output. In the absence of any signals or counts supplied to the converter 35, both outputs have a direct current voltage level which has been set at 1.3 volts as shown in the waveform of FIG. 4. As the count in the counter 34 (which count is supplied to the converter 34) increases, the speed up output increases in equal steps as shown by the upper waveform in FIG. 4, and the slow down output decreases in equal steps as indicated by the lower waveform in FIG. 4. If a total count of 31 is received, this being the total count which can be held in the stages having significances of 1, 2, 4, 8, and 16 of the counter 34, the speed up output will have a direct-current voltage level of 2.2 volts, and the slow down output will have a direct current voltage level of 0.4 volt. These output are applied to the minimum voltage gates 36, 37 along with the outputs $Q_F$ and $\overline{Q}_F$ respectively from the filters 25, 26.

In the decision and control circuit 16, the minimum voltage gates 36, 37 select the minimum voltage applied to their respective inputs, and produce this voltage at their respective outputs. These two outputs are supplied to the maximum voltage gate 39. The maximum voltage gate 39 also has an input connected to the minimum voltage gate 38. The gate 38 has two inputs which are supplied with a direct-current voltage of a +4.5 volts, and the Q output of the stage having a significance of 32. The receive pulses are applied to the inverter 31 which inverts their logic, and these inverted receive pulses are applied to one input of the AND gate 42. A second input of the AND gate 42 is connected to the Q output of the flip-flop FF2. The third input of the AND gate 42 is connected to the $\overline{Q}$ output of the second stage of the counter 43. The output of the AND gate 42 is applied to the count input C of the counter 43. The counter 43 is reset every time a piece of paper is loaded into the facsimile equipment 12 of the receiving station. This reset input may be connected to some other function if desired. The Q output of the second stage of the counter 43 is also connected to one input of the minimum voltage gate 41. The other input of the minimum voltage gate 41 is connected through a low pass filter 40 to the output of the maximum voltage gate 39. The output of the minimum voltage gate 41 is supplied to the voltage controlled oscillator 17 at the receiving station. The $\overline{Q}$ output of the second stage of the counter 43 is connected to one input of the minimum voltage gate 44. The other input of the minimum voltage gate 44 is connected to a direct current voltage of +3 volts. The output of the minimum voltage gate 44 is connected to the motor control selector 19.

Figure 5:
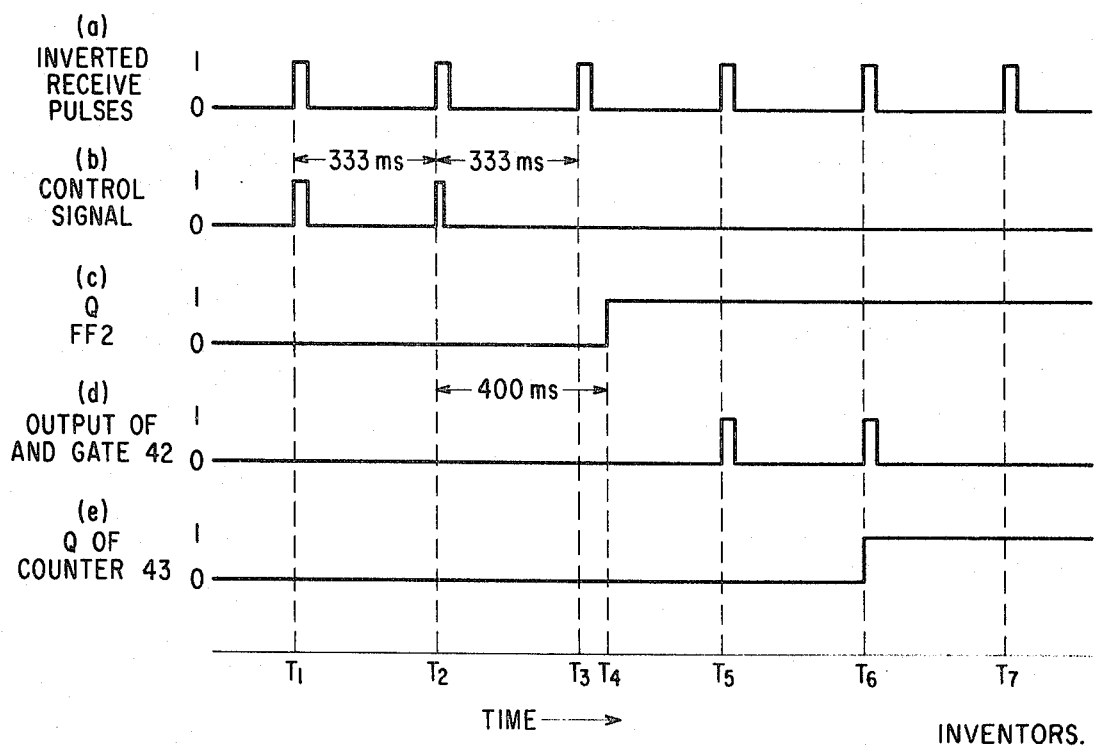
FIG. 5 shows waveforms illustrating the operation of other portions of the circuit of FIG. 2.
Figure 2B:
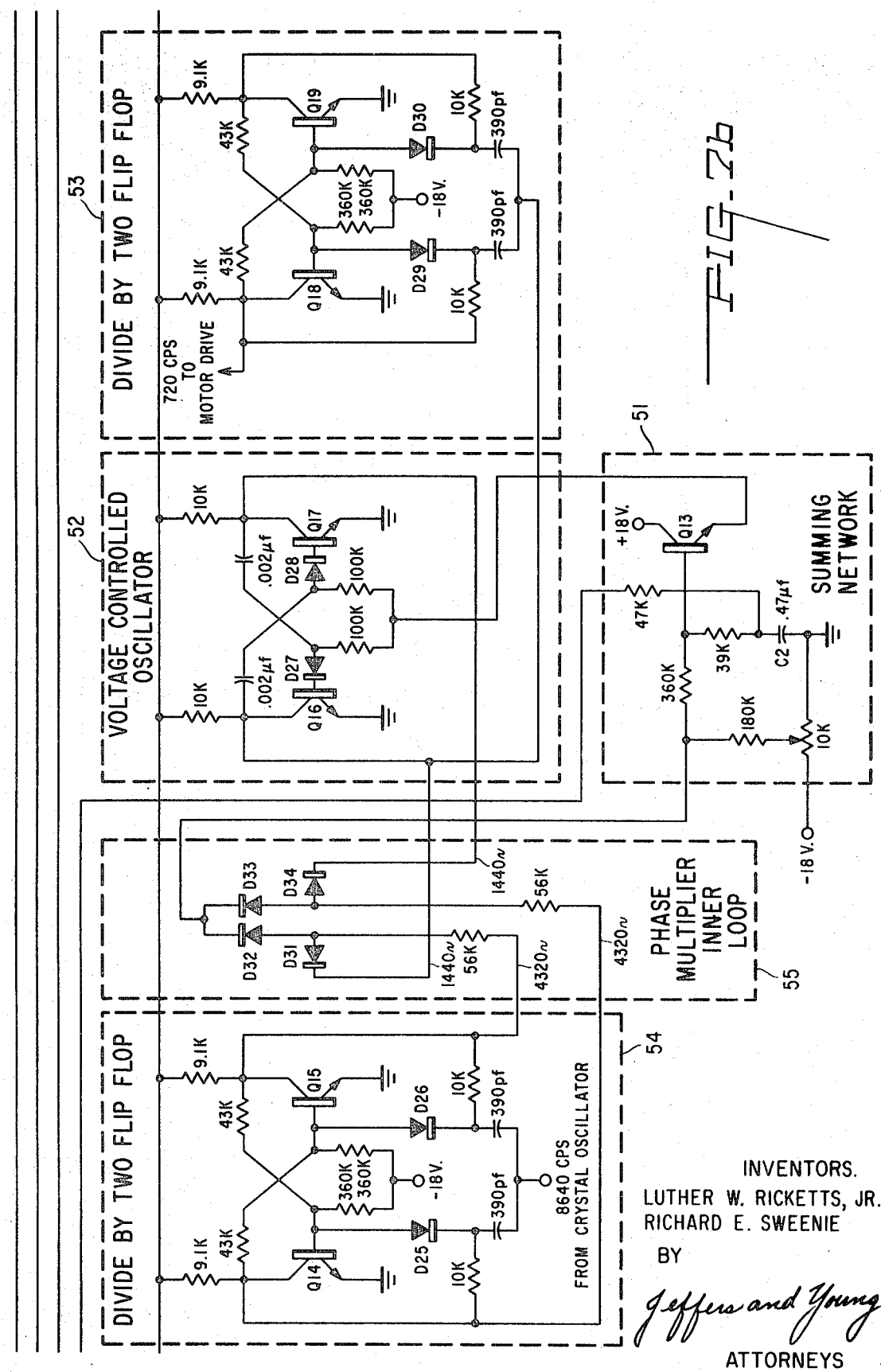

The operation of the decision and control circuit 16 will be explained in connection with the wave forms shown in FIG. 5. These waveforms are plotted along a common time axis. The inverted receive pulses applied to the AND gate 42 are shown in waveform (a). The control signal applied to the set input S of the flip-flop FF2 is shown in waveform (b), and the Q output of the flip-flop FF2 is shown in waveform (c). The output of the AND gate 42 is shown in waveform (d). And, the Q output of the second stage of the counter 43 is shown in waveform (e). As explained in connection with the operation of the error generator 14 and as shown in the waveform (i) of FIGS. 3a, 3b, and 3c, control signals are produced until synchronization of the send and receive pulses is achieved. Thereafter, no further control signals are produced. It has been assumed that the send and receive pulses are produced at the rate of approximately every 333 milliseconds. However, it should be understood that other pulse periods may be provided. These periods are indicated in waveform (a). When the receiving station was set in operation, paper was loaded in the facsimile equipment 12. This loading resets the counter 43 so that its Q output becomes a logic 0 as indicated at the time prior to the time T1. After the equipment is put into operation with the Q output of the second stage of the counter 43 at a logic 0, the minimum voltage gate 44 selects this 0 voltage. This 0 voltage is used to cause the motor control selector 19 to connect the motor 13 to the voltage controlled oscillator 17. The voltage controlled oscillator 17 receives a control voltage from the minimum voltage gate 41. This gate 41 selects the lower of two voltages, namely the voltages supplied by the low pass filter 40 or the voltage supplied by the $\overline{Q}$ output of the second stage of the counter 43. At this time, the $\overline{Q}$ output is at a logic 1 which, in this embodiment, is +4.5 volts. The filter 40 receives the highest of the voltages supplied to the maximum voltage gate 39, and this gate 39 receives the voltages from the minimum voltage gates 36, 37, 38. When the maximum speedup is called for, as indicated by the counter 34 having a count of at least 32, the Q output of the stage having a significance of 32 is at a logic 1, or +4.5 volts. Hence, the gate 38 must select a +4.5 volt signal which is applied to the maximum voltage gate 39. This voltage, along with the $\overline{Q}$ output of the second stage of the counter 43 is also at a +4.5 volts, so that the gate 41 must supply +4.5 volts, which is the maximum signal, during a speedup condition. Once the receive motor 13 approaches the speed and position of the send motor 11, the stage having a significance of 32 does not reach a count of 32, so that its Q output becomes a logic 0. Hence, the gate 38 selects the 0 voltage and supplies this voltage to the gate 39. The gate 39, therefore, selects the higher voltage supplied by the gates 36, 37. These gates 36, 37 select the lower of the two voltages applied to them. During a speedup condition, as shown between the times T4 and T11 in waveform (f) of FIGS. 3a, 3b, and 3c, the output $\overline{Q}_F$ is at a maximum value of +4.5 volts, so that the minimum voltage gate 36 selects the lower voltage, namely that between 1.3 and 2.2 volts as shown in FIG. 4. Also during this time, the output $Q_F$ is at 0 voltage, so this 0 voltage is passed by the gate 37 but is not selected by the gate 39. Rather, the gate 39 selects the voltage between 1.3 and 2.2 volts passed by the gate 36. During a slow down condition, as shown between the times T14 and T19 in waveform (e) in FIGS. 3a, 3b, and 3c, the output $Q_F$ is at a maximum voltage of around +4.5 volts, so that the gate 37 selects the voltage between 1.3 and 0.4 volts as shown in FIG. 4. Also during this time, the output $\overline{Q}_F$ is at 0 voltage, so this 0 voltage is passed by the gate 36 but is not selected by the gate 39. Rather, the gate 39 selects the voltage between 0.4 and 1.3 volts passed by the gate 37. Thus, during a maximum speed up condition, +4.5 volts is supplied to the oscillator 17. When the speed and position of the receive motor 13 approaches the speed and position of the send motor 11, the logic gates 36, 37, 38, and 39 supply the appropriate speed control voltage shown in FIG. 4 to the voltage controlled oscillator 17 so as to speed up or slow down the receive motor 13 in accordance with the count in the counter 34.

With respect to the remainder of the decision and control circuit 16, control signals are produced until synchronization takes place. In FIG. 5, two control signals occurring at the times T1 and T2 are shown in waveform (b). It has been assumed that the receive motor 13 produces pulses at approximately every 333 milliseconds as shown in waveform (a). Each time a control signal is received, this control signal is supplied to the flip-flop FF2 to set the flip-flop so that its Q output remains at a logic 0. This is because the astable period of the flip-flop FF2 is approximately 400 milliseconds, and if a control signal is received every 400 milliseconds, the flip-flop FF2 remains in the set condition with its Q output at a logic 0. As shown in FIG. 5, synchronization takes place some time after the time T2, and no control signal is produced at around the time T3. Shortly thereafter, namely approximately 67 milliseconds later at the time T4, the flip-flop FF2 returns to its stable condition with the Q output at a logic 1 as shown in waveform (c). At this time, the Q output supplied to the AND gate 42 is at a logic 1, and the $\overline{Q}$ output of the second stage of the counter 43 is at a logic 1. The next receive pulse at the time T5 is passed by the AND gate 42, as shown in waveform (d), to the count input C of the counter 43 so that a count of one is stored. At the time T6, a second receive pulse is counted by the counter 43. This second pulse causes the second stage $\overline{Q}$ output to become a logic 0 and the Q output to become a logic 1. The $\overline{Q}$ output of logic 0 blocks the AND gate 42 and causes the gate 41 to select a 0 voltage. This 0 voltage may be used to stop the voltage controlled oscillator 17 or perform any other desired function. The Q output of the second stage of the counter 43 is at a logic 1 or +4.5 volts so that it makes the transition from 0 to +4.5 volts. This is shown in the waveform (e) of FIG. 5. Thus, the minimum voltage gate 44 changes its output from 0 volt to +3 volts, and this voltage transition can be used to switch the motor control selector 19 from the voltage controlled oscillator 17 to the fixed frequency oscillator 18. Thereafter, the speed and operation of the motor 13 is controlled or maintained by the stable, fixed frequency oscillator 18, and remains in synchronization because of the stability of this oscillator 18.

Thus, the digital system shown and described above provides precise and rapid position and speed synchronization of a receive synchronous motor with the position and speed of a second synchronous motor. The embodiment shown in FIGS. 1 and 2 and explained in connection with the waveforms of FIGS. 3a, 3b, 3c, 4, and 5 is typical only, and other times and functions may be provided to achieve the same result. Those skilled in the art will realize that there are many other logical equivalents to the above embodiments, as well as the fact that other similar means can be devised for generating the error signal, and for retaining information in proportion to the time which exists between synchronization pulses.

While the synchronizing circuit described in connection with FIGS. 1 through 5 operates satisfactorily, the transition of control of the receive motor 13 from the voltage controlled oscillator 17 to the stable, fixed frequency oscillator 18 is not as smooth as it might be. Accordingly, we have provided another embodiment of a synchronizing circuit which utilizes digital techniques and signals from a fixed frequency oscillator to effect control. These signals from the fixed frequency oscillator are combined with signals from an error generator, and applied to a variable frequency, voltage controlled oscillator. As the position and speed of the receive motor approach synchronization with the position and speed of the send motor (i.e., as framing takes place), the signals from an error generator are reduced in their effect. When the position and speed of the receive motor is synchronized with the position and speed of the send motor, the voltage controlled oscillator receives signals only from the fixed frequency oscillator. This transition of control, as synchronization is achieved, is smooth and unbroken.

FIG. 6 shows a block diagram of this other embodiment of our synchronizing circuit. As shown in FIG. 6, this synchronizing circuit includes four main elements which are enclosed by dashed lines. The first element is a main loop phase detector to which send and receive pulses, indicative of the position and speed of send and receive motors, are applied. These pulses may be produced by any pulse generators operatively connected to the motors to indicate the speed and position of the motors. The main loop phase detector includes a one shot multivibrator or flip-flop FF3, a bistable multivibrator or flip-flop FF4, and an error detection circuit or phase multiplier 50. The one shot flip-flop FF3 is in a normally stable state with its Q output at a level of 0, and its $\overline{Q}$ output at a level of +V. In this embodiment, the explanation will be made on the basis of voltage levels, rather than logic 1 and logic 0. Receive pulses are applied to the set input of the flip-flop FF3. When a receive pulse transition from a level of 0 to a level of +V is applied to its set input S, the flip-flop FF3 switches to its unstable state with its Q output at a level of +V and its $\overline{Q}$ output at a level of 0. The flip-flop FF3 remains in this unstable state for a predetermined time. This time is set so that it is approximately one half the average time between adjacent or successive send or receive pulses. That is, the unstable period of the one shot flip-flop FF3 is approximately one half the period of adjacent send or receive pulses. However, as will be shown, the unstable period may have a different ratio relative to the period of send or receive pulses. The Q output of the one shot flip-flop FF3 is applied to the reset input R of the bistable flip-flop FF4. Send pulses are applied to the set input S of the flip-flop FF4. Each of the flip-flops FF3 and FF4 has a blocking input which is connected to the synchronization detector element. This blocking signal input receives a blocking signal from the synchronization detector when the send and receive pulses are synchronized, and stops the operation of the main loop phase detector. The $\overline{Q}$ output of the flip-flop FF3 and the Q output of the flip-flop FF4 are coupled to two inputs of the phase multiplier 50. The phase multiplier 50 provides a voltage summation or error signal that indicates the relative phase of its two inputs, and applies this error signal to one input of a summing network 51 in the motor drive control element.

In the motor drive control element, the summing network 51 also receives an input signal from the inner loop phase detector element. The summing network 51 holds or integrates the applied signals and produces an output signal representative or indicative of these integrated signals. This output signal is applied to a voltage controlled oscillator 52 which oscillates at a frequency determined by the applied voltage. In a quiescent or synchronized condition, the voltage controlled oscillator 52 operates at 1,440 cycles per second. The output from the oscillator 52 is applied to a divide-by-two flip-flop 53 which produces an output frequency which is applied to a receive motor, such as the receive motor 13 in FIG. 1. Normally, in the absence of speeding up or slowing down, this output frequency is 720 cycles.

The inner loop phase detector element produces a stable, fixed submultiple frequency from a fixed frequency crystal controlled oscillator. In the embodiment shown, the fixed frequency oscillator operates at a frequency of 8,640 cycles per second. This frequency is applied to a divide-by-two flip-flop 54, the output of which is applied to an error detection circuit or phase multiplier 55. The phase multiplier 55 is an exclusive OR circuit which compares the signal from the flip-flop 54 with a signal from the voltage controlled oscillator 52. The exclusive OR circuit produces an error or output signal when only one of the two applied input signals is at an upper voltage level or logic 1; but produces no output when both input signals are at a lower level or logic 0, or when both input signals are at an upper level or logic 1. This output signal is applied to the summing network 51 which holds or integrates it along with the signal from the phase multiplier 50. Thus, the output signal from the summing network 51 includes a magnitude which causes the voltage controlled oscillator 52 to have its frequency locked to or synchronized with the frequency from the local crystal oscillator. As will be explained, when synchronization is achieved and the main loop phase detector becomes inoperative, the position and speed of the receive motor is synchronized with the fixed frequency oscillator. Thus, no transition is evident or manifested as the fixed frequency oscillator assumes sole control of the receive motor.

The synchronization detector element detects or determines when the receive pulses are synchronized with the send pulses. The receive and send pulses are applied to a coincidence detector 56 which functions as a two input AND gate. (Actually, the receive and send pulses are inverted before being applied to the detector 56 as will be explained in connection with FIG. 7.) When the receive and send pulses become synchronized to any desired accuracy, the coincidence detector 56 produces an output signal which is applied to a step counter 57. The step counter 57 includes a capacitor which receives a charge from each output signal provided by the coincidence detector 56. When the capacitor has received a sufficient charge, in this embodiment when four coincidence signals are provided by the coincidence detector 56, an analog OR gate 58 activates a Schmitt trigger 59. The Schmitt trigger 59 is a bistable switching circuit which produces an abrupt level change at its output in response to an activating pulse. This level change produced by the Schmitt trigger provides the blocking signal that stops or blocks the flip-flops FF3 and FF4 in the main loop phase detector. When the flip-flops FF3 and FF4 are blocked, the motor drive control receives signals only from the inner loop phase detector and the fixed frequency oscillator. Thus, the transition of control from the main loop phase detector and the inner loop phase detector to only the inner loop phase detector is made smoothly and without noticeable effect on the receive motor. The synchronization detector includes a time delay circuit 60 which produces a signal for a predetermined time period, in this embodiment 4 seconds, after the receiving facsimile equipment is placed in operation. This time delay signal is applied to the analog OR gate 58 to prevent the synchronization detector from operating because of the possible coincidence during the starting up period. This coincidence could occur while the receive motor is building up speed, but would, of course, not be a true coincidence. Hence, the time delay prevents the synchronization detector from operating for the predetermined time period so as to let the receive motor build up to its operating speed. The analog OR gate 58 also receives a signal provided by a switch on the facsimile equipment. When the facsimile equipment is used to receive, this switch is placed in the receive mode position to provide an enabling signal to the analog OR gate 58. An operating period signal is also applied to the analog OR gate 58 and is permissive for a predetermined time period, in this embodiment 15 seconds, after the facsimile equipment is placed in the receive mode. This signal blocks the gate 58 after the predetermined time period so that the main loop phase detector becomes blocked. Thus, control of the receive motor is shifted solely to the inner loop phase detector and fixed frequency oscillator after this time period, whether synchronization has been achieved or not. This signal may, of course, be omitted.

FIGS. 7a, 7b, and 7c show a more complete electrical circuit of the block diagram of FIG. 6. These figures are to be considered together with FIG. 7a at the left, FIG. 7b in the middle, and FIG. 7c at the right. The circuits in the figures. are connected together by the connection lines positioned at corresponding locations along adjacent edges of the figures. Values for the circuit components are indicated. The circuit utilizes a number of NPN-type transistors which operate with direct current voltages of +8 and +18 volts, a reference potential or ground, and −8 and −18 volts. Receive pulses, which may be produced by existing parts of the facsimile equipment, are applied to the flip-flop FF3 at the base of the transistor Q1. Send pulses, which may also be produced by existing parts of the facsimile equipment, are applied to the base of the transistor Q4 in the flip-flop FF4. In the flip-flop FF3, the transistor Q1 is off and the transistor Q2 is on during the stable state. When a receive pulse is applied to the transistor Q1, the transistor Q1 turns on and the transistor Q2 turns off. The capacitor C1 discharges through the diode D2, the transistor Q1, and the 100K and 1K resistors. This is the unstable state. After the capacitor C1 discharges, the flip-flop FF3 returns to its stable state with the transistor Q1 off and the transistor Q2 on. When the transistor Q2 first turns on, the Q output (at the junction of the 100K and 1K resistors) becomes positive and turns the transistor Q3 on to reset the flip-flop FF4. The $\overline{Q}$ output of the flip-flop FF3 is derived from the emitter of the transistor Q2, and applied to the main loop phase multiplier 50 at the anode of the diode D8. The Q output of the flip-flop FF4 is derived from the collector of the transistor Q3 and applied to the phase multiplier 50 through a 4.7K resistor to the cathodes of the diodes D7 and D8. The output of the phase multiplier 50 is derived from the cathode of the diode D6 and the anode of the diode D7, and applied to one input of the summing network 51 at its summing capacitor C2. The other input to the summing network 51 is derived from the cathodes of the diodes D32 and D33 in the phase multiplier 55. The output of the summing network 51 is derived from the emitter of the transistor Q13 and is applied to the junction of the 100K resistors in the voltage controlled oscillator 52. Inverted send and receive pulses are derived from the collector of the transistor Q4 and the emitter of the transistor Q2 and applied to the bases of the transistors Q21 and Q20 of the coincidence detector 56.

In the inner loop phase detector, signals from a fixed frequency crystal oscillator are applied to the bases of the transistors Q14 and Q15 of the flip-flop 54. The output of the flip-flop 54 is derived from the collectors of the transistors Q14 and Q15, and applied to the anodes of the diodes D31, D32, D33, D34 in the phase multiplier 55. The other input for the phase multiplier 55 is derived from the collectors of the transistors Q16 and Q17 of the voltage controlled oscillator 52 and applied to the cathodes of the diodes D31 and D34. The output of the phase multiplier 55 is derived at the cathodes of the diodes D32 and D33 and applied to the summing network 51 at the junction of the 180K and 360K resistors.

In the synchronization detector, the inverted send and receive pulses are applied to the bases of the transistors Q21 and Q20 in the coincidence detector 56. In the absence of pulses, these transistors Q20 and Q21 are fully conducting or saturated. When send and receive pulses are received at the same time, that is when coincidence takes place, these transistors Q20 and Q21 are both turned off at the same time. This causes a positive voltage to be applied through the capacitor C3 and the diode D36 to the upper electrode of the capacitor C4. After four such positive pulses have been applied to the capacitor C4, the voltage at its upper electrode is sufficiently positive to cause the transistor Q22 in the Schmitt trigger 59 to turn on. Through regenerative action in the Schmitt trigger 59, the collector of the transistor Q22 rapidly falls from +18 volts to some negative voltage which is applied to the bases of the transistors Q1 and Q4 in the flip-flops FF3 and FF4. This negative voltage or pulse blocks the main loop phase detector to stop operation so that only signals from the fixed frequency oscillator are applied to the voltage controlled oscillator 52. The analog OR gate 58 does not permit the voltage on the capacitor C4 to turn the transistor Q22 on and operate the Schmitt trigger until other conditions are satisfied. These conditions include a 4 second time delay to charge a capacitor C5 in the time delay 60. Normally, the transistor Q24 is on. However, it is turned off by a −8 volt signal when the receive motor is turned on. With the transistor Q24 off, its collector is at +18 volts which is applied by the diode D42 to keep the Schmitt trigger transistor Q22 off and the Schmitt trigger transistor Q23 on. When the capacitor C5 becomes charged, the transistor Q24 turns on and its collector voltage falls to −18 volts. Thus, the time delay circuit 60 provides a permissive signal to the analog OR gate 58. When the equipment is placed in the receive mode, the receive mode switch changes its output to the diode D38 from +18 volts to −18 volts so that a second permissive signal is provided to the gate 58. The operating period signal is normally at 0 volts which is permissive. Therefore, the analog OR gate 58 may operate the Schmitt trigger 59 when the receive switch has been operated to provide a receive mode signal, when the motor switch has been on for 4 seconds, and when four coincidences have occurred. And, after 15 seconds, the operating period signal switches to +8 volts to operate the Schmitt trigger 59 if it has not already operated. As mentioned, operation of the Schmitt trigger 59 blocks the main loop phase detector.

FIG. 8 shows waveforms which illustrate the operation of the circuit of FIGS. 6 and 7. The waveforms of FIG. 8 are plotted along a common time axis, and show the operation of the circuit when the send pulses first lead the receive pulses, followed by a synchronized condition, followed by a receive pulse leading a send pulse, and then followed by complete synchronization. The send and receive pulses are shown in waveforms (a) and (b). The $\bar{Q}$ output of the flip-flop FF3 is shown in waveform (c), and the Q output of the flip-flop FF4 is shown in waveform (d). The output of the phase multiplier 50, derived from the $\bar{Q}$ output of the flip-flop FF3 and the Q output of the flip-flop FF4, is shown in waveform (e). This output and signals from the phase multiplier 55 are applied to the summing network 51 which produces a control signal for the voltage controlled oscillator 52. The control signal is shown in waveform (f). This control signal operates about the quiescent or synchronized voltage level indicated. This voltage level includes signals from the phase multiplier 55 in the inner loop phase detector so that when synchronization is achieved, the voltage controlled oscillator 52 will be in synchronization with the fixed frequency oscillator.

When a send pulse is received at the time T1, the Q output of the flip-flop FF4 rises from 0 to +V. The flip-flop FF3 is in the stable state so that its $\bar{Q}$ output is at +V. The $\bar{Q}$ output of the flip-flop FF3 and the Q output of the flip-flop FF4 are combined by the phase multiplier 50 so that its output rises from a level of V/2 to a level of +V. This output from the main loop phase multiplier 50 and the output from the inner loop phase multiplier 55 are applied to the summing network 51 which produces an output signal that rises from the synchronized level to some positive level. At the time T2, a receive pulse is received. This receive pulse causes the flip-flop FF3 to switch from its stable state to its unstable state. When the flip-flop FF3 changes to its unstable state, the $\bar{Q}$ output falls to a level of 0. This level of 0, combined with the level of +V at the Q output of the flip-flop FF4 causes the output of the main loop phase multiplier 50 to fall from the level +V to the level V/2. Hence, the control signal then begins to decrease toward the synchronized level. At the time T3, the flip-flop FF3 switches back to its stable state so that its $\bar{Q}$ output rises to the level +V. This causes the flip-flop FF4 to switch so that its Q output switches to a level of 0. 2. At this time, a level of +V and a level of 0 are applied to the phase multiplier so that the phase multiplier output remains at the level of V/2. Hence, the control signal continues to fall toward the synchronized level. At the time T4, another send pulse is received which causes the flip-flop FF4 to switch states so that its Q output rises to a level of +V again. Hence, the main loop phase multiplier output rises to a level of +V and the control signal begins to rise again. At this point it will be seen that the control signal provides positive voltages above the synchronized level, and this positive voltage causes the voltage controlled oscillator 52 to increase its frequency so that the receive motor speeds up. This is indicated by the next receive pulse received at the time T5. It will be noted that the receive pulse at the time T5 is nearer the preceding send pulse at the time T4 than was the receive pulse at the time T2 relative to the send pulse at the time T1. This process continues with the receive motor, and hence the receive pulses, approaching the position and speed of the send motor and the send pulses. At the time T6, a first synchronization of the send and receive pulses occurs. The flip-flop FF3 switches to its unstable state, but at the same time, the flip-flop FF4 is switched. Hence, the output of the phase multiplier 50 remains at the level of +V/2 and the control signal continues to remain at the synchronized level. It has been assumed that some amount of overshoot takes place so that another receive pulse is received at the time T7 just ahead of the next send pulse at the time T8. At the time T7, the flip-flop FF3 is switched to its unstable state so that the $\bar{Q}$ output of the flip-flop FF3 and the Q output of the flip-flop FF4 are both at a level of 0. The output of the main loop phase multiplier 50 switches from a level of +V/2 to a level of 0. Hence, the control signal falls or decreases toward some level below the synchronized level. At the time T8, a send pulse is received which switches the flip-flop FF4 so that its Q output returns to a level of +V. The output of the main loop phase multiplier 50 returns to a level of +V/2, and the control signal increases upward toward the synchronized level. Thereafter, it is assumed that synchronization is maintained so that the send pulses and receive pulses are in synchronization at the times T9, T10, and at times thereafter.

The time required for the synchronization of the receive motor and the send motor is in the order of 2 or 3 seconds. For send and receive pulses produced every 333 milliseconds, which is typical, the time elapsed from T1 to T10 in the waveforms of FIG. 8 is just over 2.3 seconds. After 4 seconds have elapsed, or whatever timing is provided by the time delay 60, and thereafter, four send and receive pulses are in synchronization; the Schmitt trigger 59 provides a triggering or blocking signal that stops the operation of the flip-flops FF3 and FF4. The output of the main loop phase multiplier 50 then remains at a level of 0 so that the summing network 51 receives signals only from the inner loop phase multiplier 55. These signals are represented by the synchronized level of the control signal and are indicative of the relative phases of the fixed frequency oscillator and the voltage controlled oscillator 52. The relative phases are maintained at 0° by the feedback or servo loop provided from the voltage controlled oscillator 52 back to the phase multiplier 55. The signals necessary to maintain the frequency of the voltage controlled oscillator 52 at the desired level are carried in the control signal at the synchronized level indicated in waveform (f). Hence, it will be seen that as synchronization is achieved, signals which provide or effect synchronization are removed, but signals controlling the frequency of the voltage controlled oscillator 52 with respect to the fixed frequency oscillator are retained. Hence, transition of control by the synchronizing circuit and the fixed frequency oscillator to only the fixed frequency oscillator is smooth and unbroken.

The unstable time period of the flip-flop FF3 is indicated in waveform (c). This period is constant and is represented by the time between the time T2 and the time T3. The period may have other values. For example, if the flip-flop FF3 has a shorter unstable time period, then its $\bar{Q}$ output would return to a level of +V/2 at an earlier time, say the time T2A. However, when the flip-flop FF3 returns to its stable state at such an assumed time T2A, the flip-flop FF4 would also be switched so that its Q output would change to a level of 0. Hence, the output of the main loop phase multiplier 50 would remain at the same level of +V/2. As a practical matter, it is preferred that the unstable state of the flip-flop FF3 be approximately one half of the time period between send pulses. Hence, for a nominal time period of 333 milliseconds between send pulses, a suitable period for the unstable state would be 150 milliseconds.

It will thus be seen that our invention provides a new and improved synchronizing circuit for synchronizing the position and speed of a receive synchronous motor with the position and speed of a send synchronous motor. This synchronizing, or framing as it is frequently called in facsimile work, is provided quickly and accurately. This framing also permits the use of a local fixed frequency oscillator. The use of this fixed frequency oscillator improves the operation of facsimile equipment, and particularly improves the appearance of a reproduced document at the receive station. This is because the receive motor is operated at a stable, fixed frequency during information transmission, and does not depend upon the send pulses to be accurately and properly transmitted over a telephone line. Such a transmission circuit may introduce time delays or other variations which could distort or impair the receive station operation.

While our invention has been described with reference to particular embodiments, it is to be understood that modifications may be made. The various times, such as the times between adjacent send pulses and adjacent receive pulses may be different. The unstable times for the one shot flip-flops may also be different. In the circuit of FIG. 6, the analog OR gate 58 may have less operating conditions applied to it, or may have additional operating conditions applied to it. The various selected times, such as the 4 seconds time delay or the 15 seconds operating period signal, may be modified or changed. Likewise, the period of the unstable state for the flip-flop FF3 may be changed.

What is claimed is:

1. A system for conforming the position and speed of a receive motor to the position and speed of a send motor, comprising:
   a. fixed frequency oscillator means for supplying fixed frequency speed control signals to the receive motor;
   b. variable frequency oscillator means for supplying variable frequency speed control signals to the receive motor;
   c. means adapted to be connected to the receive motor for producing receive pulses indicative of the rotary position and speed of the receive motor;
   d. means adapted to be connected to the send motor for producing send pulses indicative of the rotary position and speed of the send motor;
   e. means connected to said receive pulse producing means and to said send pulse producing means for producing an error signal indicative of the relative phase of said receive pulses and said send pulses;
   f. means connecting said variable frequency oscillator means to said error signal producing means for supplying error signals to said variable frequency oscillator means that control the frequency of said variable frequency speed control signals as a function of said error signal;
   g. and selector means connected to said error signal producing means for selectively applying said variable frequency speed control signals to the receive motor in response to an error signal that is greater than a predetermined magnitude and for selectively applying said fixed frequency speed control signals to the receive motor in response to an error signal that is less than a predetermined magnitude.

2. The system of claim 1 wherein said error signal has a magnitude and polarity indicative of the relative phase of said receive pulses and said send pulses.

3. The system of claim 1 wherein said selector means comprises:
   a. a first signal input connected to said variable frequency oscillator means;
   b. a second signal input connected to said fixed frequency oscillator means;
   c. a signal output selectively connected to one of said first and second inputs for supplying a speed control signal to the receive motor;
   d. and a control input connected to said error signal producing means for selectively connecting said signal output to one of said first and second inputs as a function of said error signal.

4. The system of claim 1 wherein said selector means selectively applies said fixed frequency speed control signals to the receive motor in response to an error signal that is less than a predetermined magnitude for a predetermined time period.

5. The system of claim 4 wherein said selector means comprises:
   a. a first signal input connected to said variable frequency oscillator means;
   b. a second signal input connected to said fixed frequency oscillator means;
   c. a signal output selectively connected to one of said first and second inputs for supplying a speed control signal to the receive motor;
   d. and a control input connected to said error signal producing means for selectively connecting said signal output to said first input in response to an error signal that exceeds a predetermined magnitude and for selectively connecting said signal output to said second input in response to synchronization of said receive pulses and said send pulses for a predetermined period.

6. In a facsimile system for transmitting information from a second location to a receive location, an arrangement for synchronizing the position and speed of a receiving electric motor at said receive location with the position and speed of a send electric motor at said send location, comprising:
   a. means adapted to be connected to the receive motor for producing receive pulses indicative of the rotary position and speed of the receive motor;
   b. means adapted to be connected to the send motor for producing send pulses indicative of the rotary position and speed of the send motor;
   c. means connected to said receive pulse producing means and to said send pulse producing means for producing first error signals indicative of the phase relation of said receive pulses and said send pulses;
   d. fixed frequency oscillator means for producing fixed frequency signals;
   e. a summing network connected to said first error signal producing means and to said fixed frequency oscillator means for combining said first error signals with said fixed frequency signals and producing control signals indicative of said combined signals;
f. variable frequency oscillator means connected to said summing network for applying signals that vary as a function of said control signals to the receive motor;
g. and connected to said first error signal producing means for rendering said first error signal producing means inoperative in response to the phase relation of said send and receive pulses being synchronized for a predetermined time.

7. In a facsimile system for transmitting information from a send location to a receive location, an arrangement for synchronizing the position and speed of a receive electric motor at said receive location with the position and speed of a send electric motor at said send location, comprising:
  a. means adapted to be connected to the receive motor for producing receive pulses indicative of the rotary position and speed of the receive motor;
  b. means adapted to be connected to the send motor for producing send pulses indicative of the rotary position and speed of the send motor;
  c. means connected to said receive pulse producing means and to said send pulse producing means for producing first error signals indicative of the phase relation of said receive pulses and said send pulses;
  d. fixed frequency oscillator means for producing fixed frequency signals;
  e. a summing network connected to said first error signal producing means and to said fixed frequency oscillator means for combining said first error signals with said fixed frequency signals and producing control signals indicative of said combined signals;
  f. variable frequency oscillator means connected to said summing network for applying signals that vary as a function of said control signals to the receive motor;
  g. means for producing synchronizing signals in response to said receive pulses being synchronized with said send pulses;
  h. and means coupling said synchronizing signal producing means to said first error signal producing means for rendering said first error signal producing means inoperative in response to synchronizing signals for a predetermined length of time.

8. The arrangement of claim 7, and further comprising:
  a. means connected to said fixed frequency oscillator means and to said variable frequency oscillator means for producing second error signals indicative of the relative phase of said fixed frequency signals and said variable frequency oscillator signals;
  b. and means connecting said second error signal producing means between said fixed frequency oscillator means and said summing network.

9. A system for synchronizing the position and speed of a receive electric motor at a receive location with the position and speed of a send electric motor at a send location, comprising:
  a. means connected to the receive motor for producing receive pulses indicative of the rotary position and speed of the receive motor;
  b. means connected to the send motor for producing send pulses indicative of the rotary position and speed of the send motor;
  c. means connected to said receive pulse producing means and to said send pulse producing means for producing error speed control signals which vary in conformity with variations in the relative phase of said receive pulses and said send pulses;
  d. first means producing fixed frequency motor speed control signals;
  e. second means producing motor speed correcting signals different in frequency from that of said first means;
  f. and selector means connected to said error signal producing means and operable for connecting said second means to the receive motor in response to error speed control signals that exceed a predetermined magnitude and for connecting said first means to the receive motor in response to error speed control signals less than said predetermined magnitude.

10. The system according to claim 9 in which said second means includes means for selectively supplying motor speed control signals which are higher or lower in frequency than said fixed frequency motor speed control signals dependent upon the error speed control signals indicating a trailing or leading condition respectively of said first motor.

11. The system according to claim 10 in which said second means comprises an adjustable frequency oscillator connected to be sensitive to the magnitude of said error speed control signals.

12. The system according to claim 1 in which said means for producing an error signal comprises means for producing error signals in the form of voltage signals which vary in steps as the relative phase of said receive pulses and send pulses vary, and said adjustable frequency oscillator means being voltage sensitive whereby the frequency supplied thereby varies in steps in conformity with variations in said voltage signals.

13. The system according to claim 12 in which said means for producing voltage signals comprises a digital circuit including a counter and a clock for supplying pulses to said counter, the count stored in said counter influencing the voltage of said voltage signals, the length of time said clock supplies pulses to said counter varying in conformity with the phase difference between said receive pulses and said send pulses.

14. In a facsimile system the method of synchronizing the speed and position of a first synchronous drive motor with the speed and position of a second synchronous drive motor which comprises:
  driving said second motor at a predetermined speed;
  comparing the speed and position of the first motor with the speed and position of the second motor and providing one of a plurality of discrete output voltage levels in the response thereto;
  selectively connecting said first motor to one of a fixed frequency source and a variable frequency source having frequency outputs different from that of the fixed frequency source in response to the results of said comparing, said first motor being connected to said fixed frequency source when said comparison indicates the two motors are substantially synchronized; and
  varying the frequency of said variable frequency source in response to the magnitude of the difference between the speed and position of the first motor and that of the second motor as indicated by said voltage output levels.

* * * * *